March 13, 1973  E. S. COLLINSON ET AL  3,720,058
COMBUSTOR AND FUEL INJECTOR
Filed Jan. 2, 1970  3 Sheets-Sheet 1
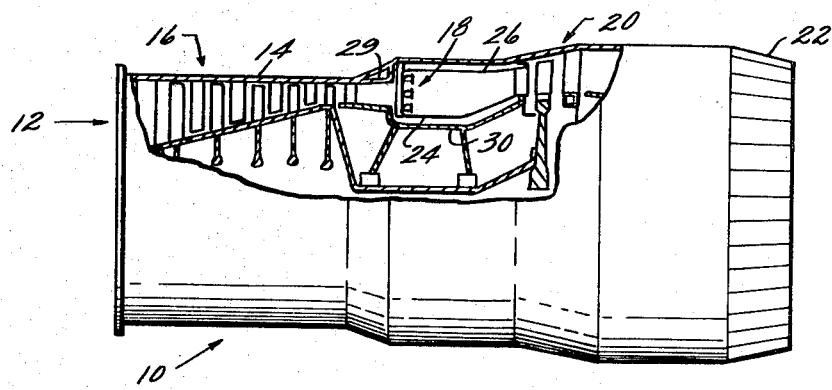
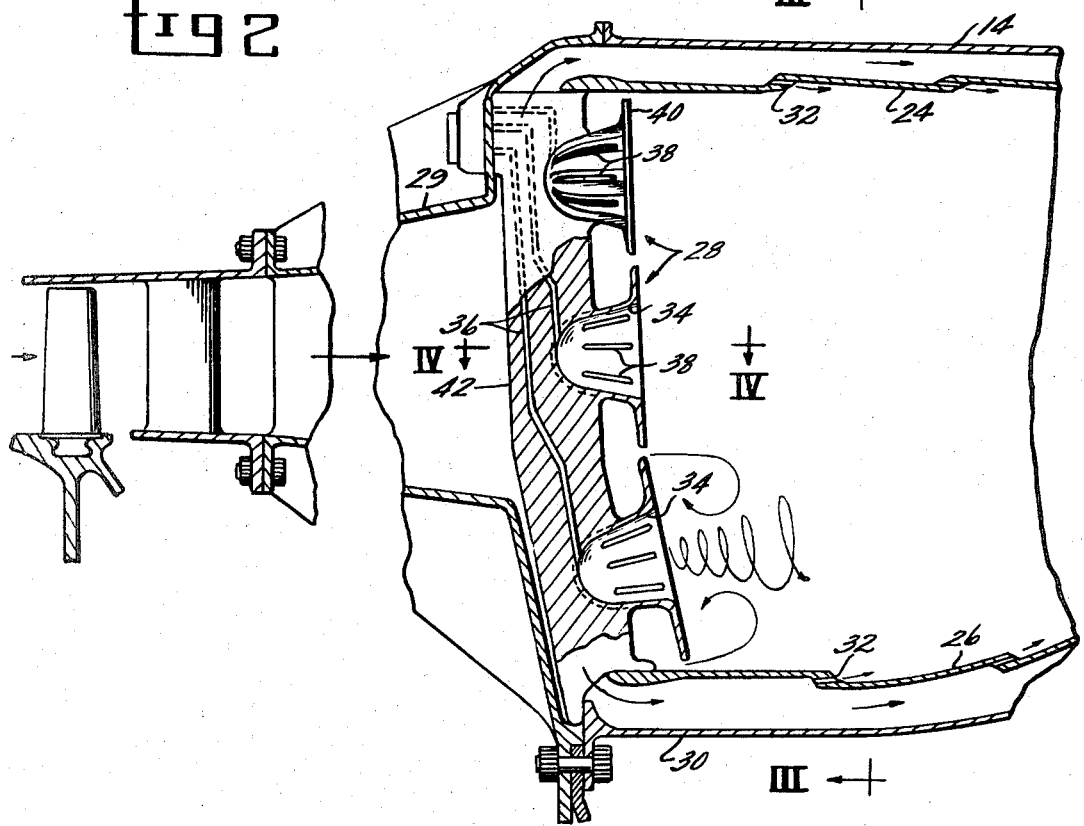
INVENTORS.
WERNER E. HOWALD
ERIC S. COLLINSON
DECEASED
BY
ATTORNEY

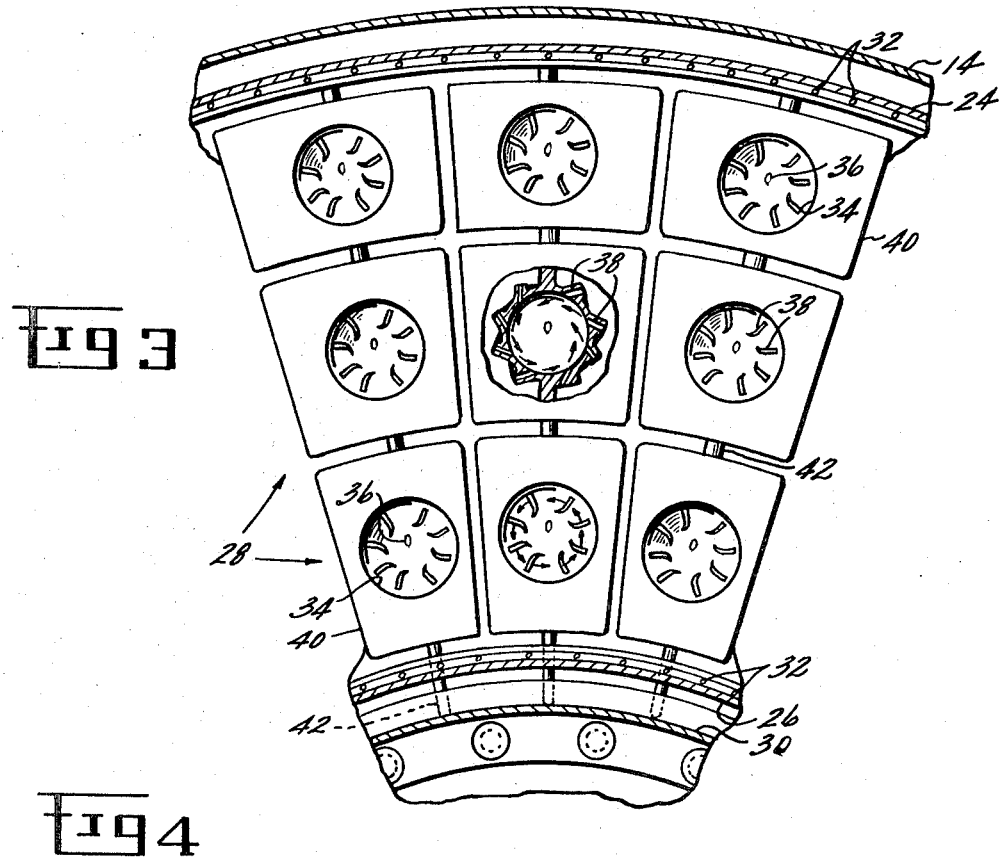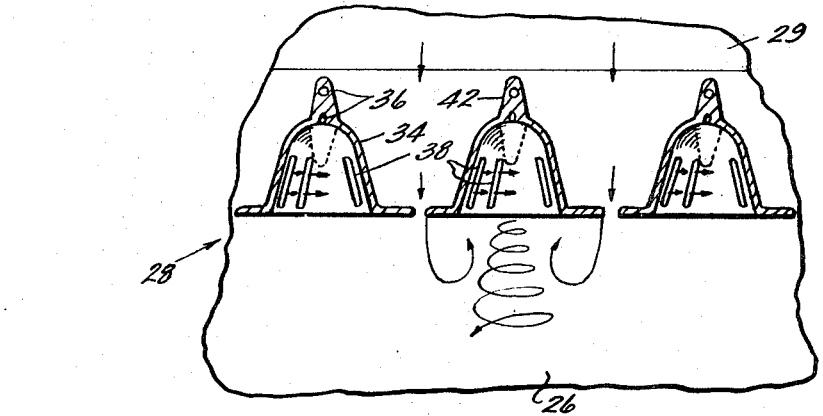

INVENTORS
WERNER E. HOWALD
ERIC S. COLLINSON
DECEASED
BY
ATTORNEY

United States Patent Office 3,720,058
Patented Mar. 13, 1973

3,720,058
COMBUSTOR AND FUEL INJECTOR
Eric S. Collinson, deceased, late of Loveland, Ohio, by Eva M. Collinson, executrix, Loveland, and Werner E. Howald, Cincinnati, Ohio, assignors to General Electric Company
Filed Jan. 2, 1970, Ser. No. 352
Int. Cl. F02g 1/00
U.S. Cl. 60—39.74 R                  9 Claims

ABSTRACT OF THE DISCLOSURE

A fuel injector is shown having a hemisperical cup which opens downstream into a combustion zone. A baffle plate extends outwardly of the cup. Air entering tangential slots creates an axial vortex which breaks up fuel introduced tangentially at the rear of the cup. Air flowing over the edges of the cup creates a peripheral vortex. The combined action of these vortices provides a stable flame front of short axial length. The fuel injectors are disposed in three circumferential rows around an annular combustion zone. The injectors are radially aligned on integral mounting struts. Alternate alignments and shapes of injectors are shown.

---

The present invention relates to improvements in fuel combustors particularly suited to the needs of gas turbine engines and improved fuel injectors therefor.

While combustors for burning fuel to generate a hot gas stream are employed in many applications, one of the most, if not the most, demanding applications is gas turbine engines, and gas turbine engines employed in the propulsion of aircraft have requirements which are particularly demanding. Aircraft engines operate under a wide variety of ambient temperature and pressure conditions wherein combustion must be sustained or varied over a wide range of fuel flow rates and fuel-to-air ratios. Beyond this, combustion efficiency requirements are extremely high, as is the related requirement of smoke-free combustion.

Accordingly, one object of the invention is to meet the above-referenced requirements in a fashion superior to prior combustor constructions.

Previously these requirements have been most effectively met by annular combustors wherein spray nozzles introduce atomized fuel into the combustion zone. One of the most significant problems encountered has been in properly atomizing widely varying rates of fuel flow. Even with sophisticated and complicated nozzle designs, this capability remains a problem. An equally serious problem is that, in extending the flow rate capability of spray nozzles, the fuel has had to be pressurized to high levels. This introduces several complicating factors in pump design, as well as increasing the weight of the components carrying the high pressure fuel.

Accordingly, another object of the invention is to minimize the problems normally associated with injecting fuel into a combustor at widely varying flow rates.

These ends are attained by a fuel injector comprising a divergent cup open towards a combustion zone. Air introduced through tangential slots in the cup creates an axial vortex which effectively breaks up fuel introduced through a tangential passageway at the rear of the cup. A plate projects outwardly from the downstream end of the cup. Air flowing around the edges of this plate creates a peripheral vortex. The combined shearing action of these vortices breaks the fuel up into a highly combustible mixture which maintains a stable flame front of very short length.

The injectors may be arranged in circumferential rows around an annular combustion zone defined by inner and outer liners. The plates are preferably in the form of segments which are closely spaced from each other and the liners to accelerate the air flow which generates the peripheral vortices.

The injectors of the circumferential rows may be radially aligned and formed integrally with a mounting strut. Alternatively they may be offset or disposed in a honeycomb to minimize vortical interference at adjacent edges of the plates.

The above and other related objects and features of the invention will be apparent from a reading of the following description of the disclosure found in the accompanying drawing and the novelty thereof pointed out in the appended claims.

In the drawings:

FIG. 1 is a simplified, longitudinal section of a gas turbine engine embodying, in its combustor, the present invention;

FIG. 2 is an enlarged view of the upstream portion of this combustor;

FIG. 3 is a view taken on line III—III in FIG. 2;

FIG. 4 is a section, on a further enlarged scale, taken on line IV—IV in FIG. 3;

Figure 5:
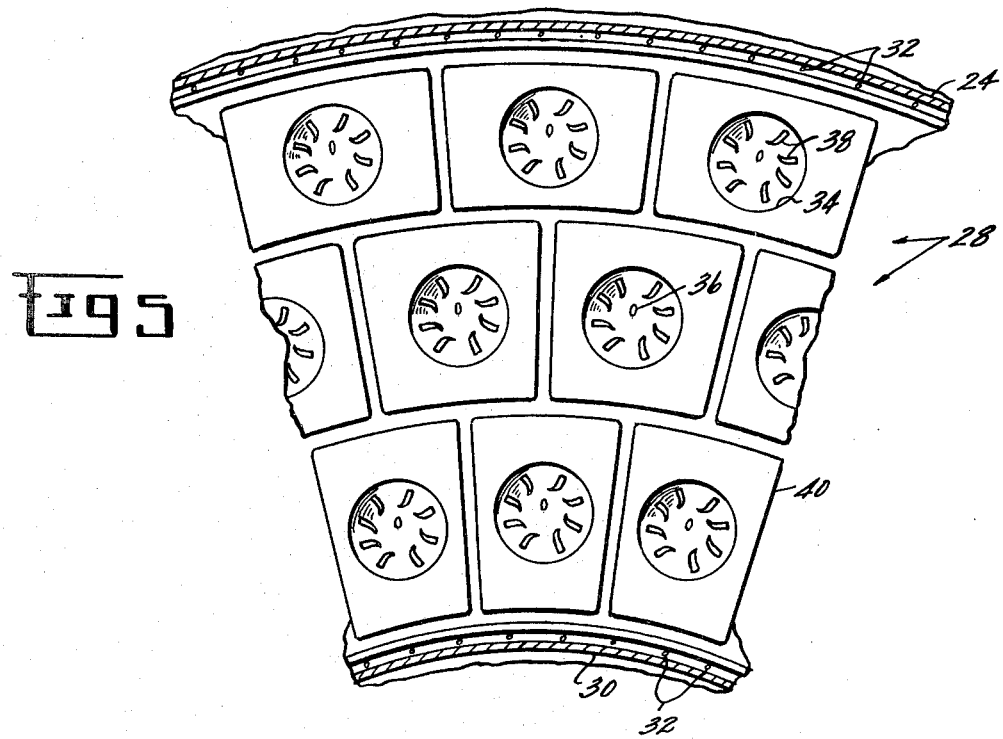
FIG. 5 is a section similar to FIG. 2 showing an alternate combustor construction.

FIG. 1 briefly illustrates the basic components of a gas turbine engine 10. Air entering inlet 12, at one end of the engine casing 14, is pressurized by an axial flow compressor 16. This pressurized air supports combustion of fuel in a combustor 18 to generate a high energy hot gas stream. The hot gas stream drives a turbine 20 which, in turn, drives the rotor of the compressor 16. The remainder of the gas stream energy is converted to a useful output, as in the illustrated engine, by discharge from a propulsive nozzle 22. The engine 10 is intended to be illustrative of the environment for the present invention and not to necessarily depict a flight type engine.

The combustor 18 comprises inner and outer liners 24, 26 which define an annular combustion zone. The upstream end of the combustion zone is defined by a plurality of fuel injectors 28 which are preferably disposed in two or more circumferential rows. Pressurized air from the compressor 16 passes to a diffuser 29 and then to the combustor. The liners 24, 26 are respectively spaced from the outer casing 14 and an inner casing 30 to provide a flow path for compressor discharge air which insulates the liners from the casings and passes through holes 32, in the liners, to cool their inner surfaces. The remainder of the compressor discharge air (excluding portions which may be used for other purposes such as cooling) enters the combustion zone through and around the injectors 28 to support combustion of fuel.

To more specifically describe the injectors, each injector 28 comprises a generally divergent, hemispherical cup 34 having its open end facing a downstream direction. A fuel passage 36 opens tangentially into the rear of each cup. A vortex is generated in the cup by compressor discharge air entering tangential slots 38 (FIGS. 3 and 4), formed longitudinally of and spaced around the cup. This axial vortex forms a shear plane which acts as a barrier to prevent escape of fuel from the cup until it has been broken up and entrained in the vortex. Generation of the vortex in the hemispherical cup produces the highest swirling velocities and lowest vortex core pressures at the discharge end of the cup. This tends to maintain the broken up fuel in a plane immediately downstream of the cup, as will be further referenced. Additionally, the lower vortex velocities and the higher core pressures at the rear of the cup tend to prevent a combustible mixture being formed at this point and thus minimize, if not eliminate, carbon formation in the cup, even at very low fuel-to-air ratios.

A baffle plate 40 is disposed at the downstream end of each cup 34. The plates 40 are generally of segment outline, and the plates of adjacent injectors are closely spaced with a substantially uniform spacing being maintained. The edges of the plates 40, adjacent the liners 24, 26, are also spaced therefrom with the same uniformity of spacing being maintained. The spaced plates form nozzles which accelerate the compressor discharge air as it enters the combustion zone. This high velocity air tends to generate a vortex peripherally around each plate, as indicated in FIGS. 2 and 4. This peripheral vortex, in combination with the axial vortex generated from the cup 34, provides a highly effective shear field for breaking up the fuel into finely dispersed particles in a combustible fuel-to-air mixture, which is maintained in a relatively stable plane, allowing the combustion process to be carried out in a relatively short axial length. A high degree of efficiency is obtained by reason of the fact that the peripheral vortices provide a continuous supply of air to the over-rich axial vortex. To further explain, under normal fuel-to-air ratios, the mixture created in the cup vortex is over-rich and cannot support combustion. The mixture created by the combined action of this vortex and the peripheral vortex contains sufficient air to fully complete the combustion process. The result is a very stable flame front of short axial length.

Exclusive of the small amounts of cooling air which enters the holes 32, all of the air for the combustion process within the combustion zone enters the slots 38 or passes around the baffle plates 40. This further contributes to the short stable flame front.

From a structural standpoint, it will be noted that the fuel injectors 28 are mounted on struts 42 which are secured to the casing 14. From FIG. 3 it will be seen that the injectors are arranged in three circumferential rows with the injectors being radially aligned. Each strut 42 is formed integrally with the radially aligned, fuel injectors 28 in each of the circumferential rows. The passages 36 are formed within the strut 42 and are connected to an appropriate source of fuel including a fuel control which meters the required amount of fuel to be supplied to the fuel injectors. The pressure of the fuel will be relatively low, sufficient only to flow the required fuel rates.

FIG. 5 illustrates an alternate arrangement in which the injectors of one row are angularly offset from the injectors of the adjacent row. By thus offsetting the radial gap between the plates of one row from the radial gap between the plates of an adjacent row, the interference between vortices at adjacent edges of the plates is minimized.

Figure 6:
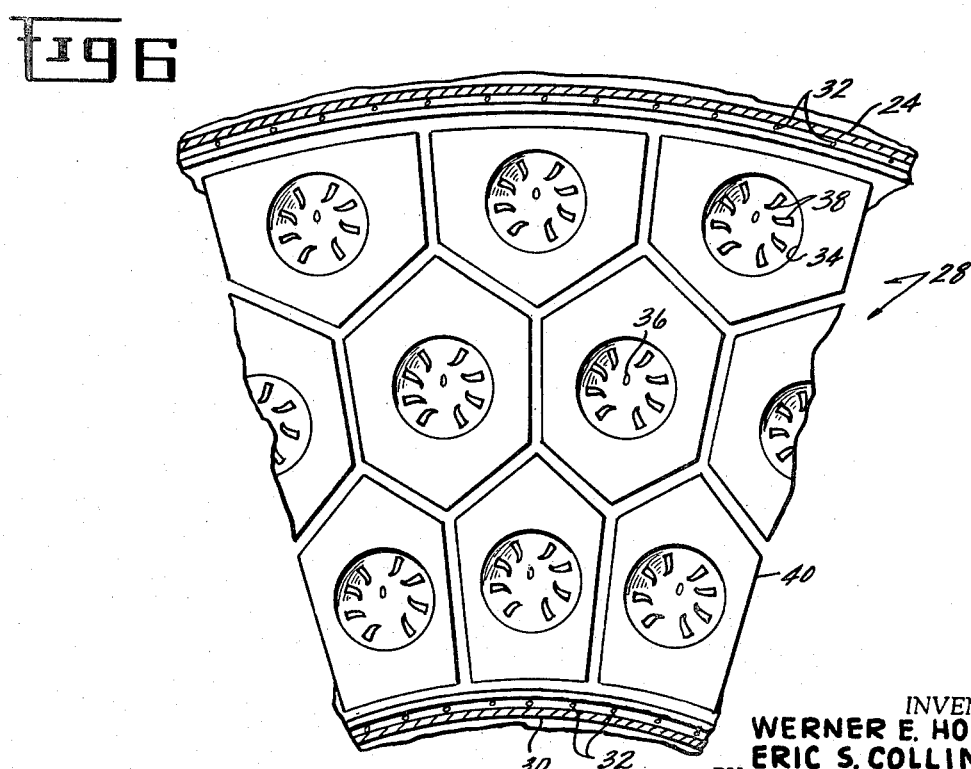
FIG. 6 is a section similar to FIG. 2 showing another alternate combustor construction.

FIG. 6 illustrates another alternate arrangement for minimizing such interference. In FIG. 6 adjacent sides of a plate 40′, where both are spaced from another plate 40′, have an included angle of approximately 120°, thus forming a hexagonal honeycomb with the circular bounds of the liners 24, 26.

The present invention involves the conversion of a liquid fuel to combustible mixture. As in most combustors, there are several mechanisms which may be involved, including vaporization, atomization and carburetion, and the term "breaking up" is herein used generically to include such mechanisms in the conversion process.

The above and other modifications which will be apparent to those skilled in the art are intended to be within the scope and spirit of the present invention.

Having thus described the invention, what is claimed as novel and desired to be secured by Letters Patent of the United States is:

1. A fuel injector to be disposed in an air stream, said injector comprising,
   a cup, open in a downstream direction,
   a plurality of longitudinal slots angled generally tangentially to the inner surface of the cup and spaced therearound, said slots providing for the entry of air to generate a vortical flow axially of said cup,
   relatively low pressure fuel delivery means for directing fuel onto the inner surface of said cup upstream of said slots whereby the fuel will be broken up by the shearing action of the entering air streams and carried into the vortical discharge from the cup,
   a plate projecting outwardly from the downstream end of said cup and disposed generally in a plane normal to the direction of air flow,
   whereby air flow around the injector will create vortices peripherally of the cup to further break up the fuel by the shearing action of the vortices with the cup vortex,
   a second cup and plate, as previously defined, which are generally aligned with first cup and plate, and
   interconnecting means extending between said cups, said fuel directing means cooperating with said interconnecting means for delivering fuel to said cups.

2. A fuel injector to be disposed in an air stream, said injector comprising,
   a cup, open in a downstream direction,
   a plurality of longitudinal slots angled generally tangentially to the inner surface of the cup and spaced therearound, said slots providing for the entry of air to generate a vortical flow axially of said cup,
   means for directing fuel onto the inner surface of said cup upstream of said slots whereby the fuel will be broken up by the shearing action of the entering air streams and carried into the vortical discharge from the cup,
   a plate projecting outwardly from the downstream end of said cup and disposed generally in a plane normal to the direction of air flow,
   whereby air flow around the injector will create vortices peripherally of the cup to further break up the fuel by the shearing action of the vortices with the cup vortex,
   a second cup and plate, as previously defined, which are generally aligned with the first cup and plate, and
   an airfoil strut formed integrally with and interconnecting said two cups,
   said fuel directing means include passageways extending through said struts.

3. A fuel injector to be disposed in an air stream, said injector comprising,
   a cup, open in a downstream direction,
   a plurality of longitudinal slots angled generally tangentially to the inner surface of the cup and spaced therearound, said slots providing for the entry of air to generate a vortical flow axially of said cup,
   means for directing fuel onto the inner surface of said cup upstream of said slots, whereby the fuel will be broken up by the shearing action of the entering air streams and carried into the vortical discharge from the cup,
   a plate projecting outwardly from the downstream end of said cup and disposed generally in a plane normal to the direction of air flow,
   whereby air flow around the injector will create vortices peripherally of the cup to further break up the fuel by the shearing action of these vortices with the cup vortex, in further combination with,
   a plurality of other fuel injectors as previously defined, said fuel injectors being generally aligned with adjacent edges of the plates in spaced relationship, and
   liner means, spaced from the edges of adjacent fuel injector plates, defining a combustion zone downstream of the injectors.

4. A combination of claim 3 wherein, the spacing between adjacent plates and the spacing between the plates and the liner means meter substantially equal amounts of air to each fuel injector.

5. A combination as in claim 3 wherein,
the liner means comprise a pair of concentric, spaced annular shells defining an annular combustion zone,
the fuel injectors are disposed in a plurality of circumferential rows, and
the spacing between plates and between the plates and the liners and, further, the cup slots introduce essentially all of the air required for the degree of combustion which is to take place in the combustion zone defined by said liner shells.

6. A combination as in claim 5 wherein, said plates are segments and the space between the plates and between the plates and the liner means meter substantially equal amounts of fuel to each fuel injector.

7. A combination as in claim 6 wherein,
the fuel injectors of each circumferential row are respectively radially aligned, and
an airfoil strut is formed integrally with and integrally connects each aligned set of fuel injectors and said fuel-directing means includes passageways extending through said struts.

8. A combination as in claim 6 wherein, the fuel injectors of each circumferential row are angularly offset with respect to the fuel injectors of each adjacent row.

9. A combination as in claim 5 wherein, adjacent sides of a plate which are spaced from plates of an adjacent fuel injector have an included angle of approximately 120°.

References Cited

UNITED STATES PATENTS

| | | | |
|---|---|---|---|
| 2,840,989 | 7/1958 | Macaulay | 60—39.65 |
| 2,930,194 | 3/1960 | Perkins | 60—39.65 |
| 2,801,134 | 7/1957 | Neugebauer et al. | 239—466 |
| 2,867,982 | 1/1959 | Clarke et al. | 60—39.69 |

FOREIGN PATENTS

| | | | |
|---|---|---|---|
| 376,570 | 5/1923 | Germany | 60—39.65 |

SAMUEL FEINBERG, Primary Examiner